United States Patent
Tu et al.

(10) Patent No.: US 8,284,759 B2
(45) Date of Patent: Oct. 9, 2012

(54) SYSTEM AND METHOD FOR COMPRESSING VOICE OVER IP HEADERS

(75) Inventors: Ming-Hsu Tu, Somerset, NJ (US);
Tomas S. Yang, Parsippany, NJ (US);
Pengfei Zhu, Morris Plains, NJ (US)

(73) Assignee: Alcatel Lucent, Paris (FR)

( * ) Notice: Subject to any disclaimer, the term of this patent is extended or adjusted under 35 U.S.C. 154(b) by 1069 days.

(21) Appl. No.: 11/343,770

(22) Filed: Jan. 31, 2006

(65) Prior Publication Data
US 2007/0189278 A1 Aug. 16, 2007

(51) Int. Cl.
*H04L 12/66* (2006.01)
*G06F 15/16* (2006.01)

(52) U.S. Cl. .................... 370/352; 709/247
(58) Field of Classification Search .......... 370/216, 370/254, 255, 310, 352–356, 389, 392, 395.22; 709/247
See application file for complete search history.

(56) References Cited

U.S. PATENT DOCUMENTS

| | | | |
|---|---|---|---|
| 6,263,466 B1 * | 7/2001 | Hinedi et al. | 714/755 |
| 6,542,504 B1 * | 4/2003 | Mahler et al. | 370/392 |
| 6,618,397 B1 * | 9/2003 | Huang | 370/474 |
| 7,257,158 B1 * | 8/2007 | Figueredo et al. | 375/240.01 |
| 7,430,617 B2 * | 9/2008 | Walsh et al. | 709/247 |
| 7,469,317 B2 * | 12/2008 | Robotham | 711/118 |
| 7,558,882 B2 * | 7/2009 | Walsh et al. | 709/247 |
| 7,620,870 B2 * | 11/2009 | Srinivasan et al. | 714/748 |
| 7,817,635 B2 * | 10/2010 | Akhtar et al. | 370/392 |
| 2002/0029285 A1 * | 3/2002 | Collins | 709/232 |
| 2002/0035596 A1 * | 3/2002 | Yang et al. | 709/203 |
| 2003/0046432 A1 * | 3/2003 | Coleman et al. | 709/247 |
| 2004/0151398 A1 * | 8/2004 | Betrisey et al. | 382/260 |
| 2004/0252671 A1 * | 12/2004 | Lee et al. | 370/349 |
| 2005/0210151 A1 * | 9/2005 | Abdo et al. | 709/247 |
| 2006/0039358 A1 * | 2/2006 | Kim | 370/352 |
| 2006/0153423 A1 * | 7/2006 | Collins | 382/100 |
| 2007/0223574 A1 * | 9/2007 | Roman et al. | 375/240.01 |
| 2008/0162521 A1 * | 7/2008 | Browning | 707/101 |
| 2009/0031044 A1 * | 1/2009 | Barrack et al. | 709/247 |
| 2010/0281004 A1 * | 11/2010 | Kapoor et al. | 707/693 |

* cited by examiner

*Primary Examiner* — Davetta W Goins
*Assistant Examiner* — Mohammad Islam
(74) *Attorney, Agent, or Firm* — Fletcher Yoder

(57) ABSTRACT

There is provided a system and method for compressing voice-over-IP headers. More specifically, in one embodiment, there is provided a method comprising receiving a voice-over-IP packet including at least one packet header that contains a set of one or more packet header field values, selecting a content identifier that corresponds to the one or more packet header field values of the received packet, replacing at least one of the packet-header field values in the received packet with the selected content identifier, thereby to create a compressed voice-over-IP packet, and transmitting the compressed voice-over-IP packet across a network connection.

20 Claims, 3 Drawing Sheets

SYSTEM AND METHOD FOR COMPRESSING VOICE OVER IP HEADERS

BACKGROUND OF THE INVENTION

1. Field of the Invention

This invention relates generally to transmitting voice telephone calls over Internet Protocol ("IP") based networks.

2. Discussion of the Related Art

This section is intended to introduce the reader to various aspects of art that may be related to various aspects of the present invention, which are described and claimed below. This discussion is believed to be helpful in providing the reader with background information to facilitate a better understanding of the various aspects of the present invention. Accordingly, it should be understood that these statements are to be read in this light, and not as admissions of prior art.

One of the paramount challenges facing modern wireless telephone systems is the rapid growth of consumer demand for data services, such as Internet access, text messaging, and e-mail. In fact, consumers are demanding greater access to data related services than ever before, and this trend is not likely to change. For example, in the coming years, consumers will likely expect their wireless telephones to provide many, if not all, of the communications features currently provided by computers communicating over wireline, (e.g., video conferencing, picture mail, etc.). Unfortunately, building or upgrading the wireless telecommunications infrastructure is relatively expensive.

Voice over IP ("VoIP") is one of many recent wireless telephone advances that may challenge the capacity of the existing wireless communication infrastructure. VoIP systems move the routing of audio telephone calls away from conventional circuit switching networks to packets-based systems. One of the advantages of VoIP is that the IP packets that carrying the voice, referred to as VoIP packets, can be routed over a packet-based networks, such as the Internet or a cellular data network. Unlike conventional circuit switching phone systems that employ a constant connection during telephone calls, VoIP systems only send voice data packets across the network as they are needed. For example, VoIP packets are created and transmitted at the moment a user talks but not when the user listens or either end is in silence. As such, networks that employ VoIP systems may be able to support more telephone conversations over the same bandwidth as conventional circuit switched systems.

Employing VoIP systems in wireless network presents additional challenges that ay be not found in wireline VoIP systems. Most VoIP systems combine small pieces f telephone audio with a header, referred to as the "inner header," that contains network routing for the telephone call and quality of service (QoS) information to create VoIP packets that can travel via the Internet. With wireless VoIP system, however, the VoIP packets also have to traverse through the wireless network, referred to as the Radio Access Network ("RAN"), to reach the Internet. In order to navigate the RAN, the VoIP packets are encapsulated with a second set of headers, known as the "outer header," that contain network information for the RAN. After the VoIP packet navigates through the RAN to the Internet, the outer header can be removed from the VoIP packet. The VoIP packet may then travel through the Internet to the intended recipient of the telephone call. When the VoIP packet reaches its intended destination, the telephone audio from a plurality of VoIP packets are reformed and the original telephone conversation is reconstructed with a voice decoder.

In a typical VoIP packet, however, the headers may occupy a significant percentage of the overall VoIP packet size—fifty percent or more in some cases. For example, in the IPv4 standard, approximately sixty percent of each VoIP packet is used by the headers. Similarly, in the IPv6 protocol, approximately seventy percent of the total packet size is used by the headers. Using sixty percent or more of each VoIP packet to transmit headers, however, is inefficient. This inefficiency is especially significant in the RAN, because the backhaul bandwidth of the RAN is typically limited. For example, a typical RAN may employ relatively low bandwidth T1 lines to link components together. As such, it would be advantageous to be able to reclaim some percentage of the VoIP packet space occupied by the headers.

BRIEF SUMMARY OF THE INVENTION

Certain aspects commensurate in scope with the disclosed embodiments are set forth below. It should be understood that these aspects are presented merely to provide the reader with a brief summary of certain aspects the invention might take and that these aspects are not intended to limit the scope of the invention. Indeed, the invention may encompass a variety of aspects that may not be set forth below.

There is provided a system and method for compressing voice-over-IP headers. More specifically, in one embodiment, there is provided a method comprising receiving a voice-over-IP packet including at least one packet header that contains a set of one or more packet header field values, selecting a content identifier that corresponds to the one or more packet header field values of the received packet, replacing at least one of the packet-header field values in the received packet with the selected content identifier, thereby to create a compressed voice-over-IP packet, and transmitting the compressed voice-over-IP packet across a network connection

BRIEF DESCRIPTION OF THE SEVERAL VIEWS OF THE DRAWINGS

Advantages of the invention may become apparent upon reading the following detailed description and upon reference to the drawings in which.

DETAILED DESCRIPTION OF THE INVENTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions should be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The embodiments described below may be directed towards a system and method for compressing voice over IP ("VoIP") packet headers. More specifically, one or more of the embodiments described herein may be directed towards a VoIP device configured to associate one or more content identifiers with one or more VoIP packet header values and, once associated, to replace a header of the VoIP packet with the content identifier associated with the header values of the VoIP packet.

Although the majority of the embodiments described herein focus on the compression of VoIP packet headers used to facilitate the transmission of the VoIP packet through a Radio Access Network ("RAN"), it will be appreciated the compression of the RAN-related headers (i.e., the outer header) is merely exemplary. As such, in alternate embodiments, the compression techniques described and claimed herein may be applied to other suitable VoIP headers or to other suitable packet-based networks. For example, in one alternate embodiment, the techniques described below may be applied to other suitable networks or applications for which the packet payload is smaller than or comparable to the IP and/or UDP/TCP headers.

Figure 1:
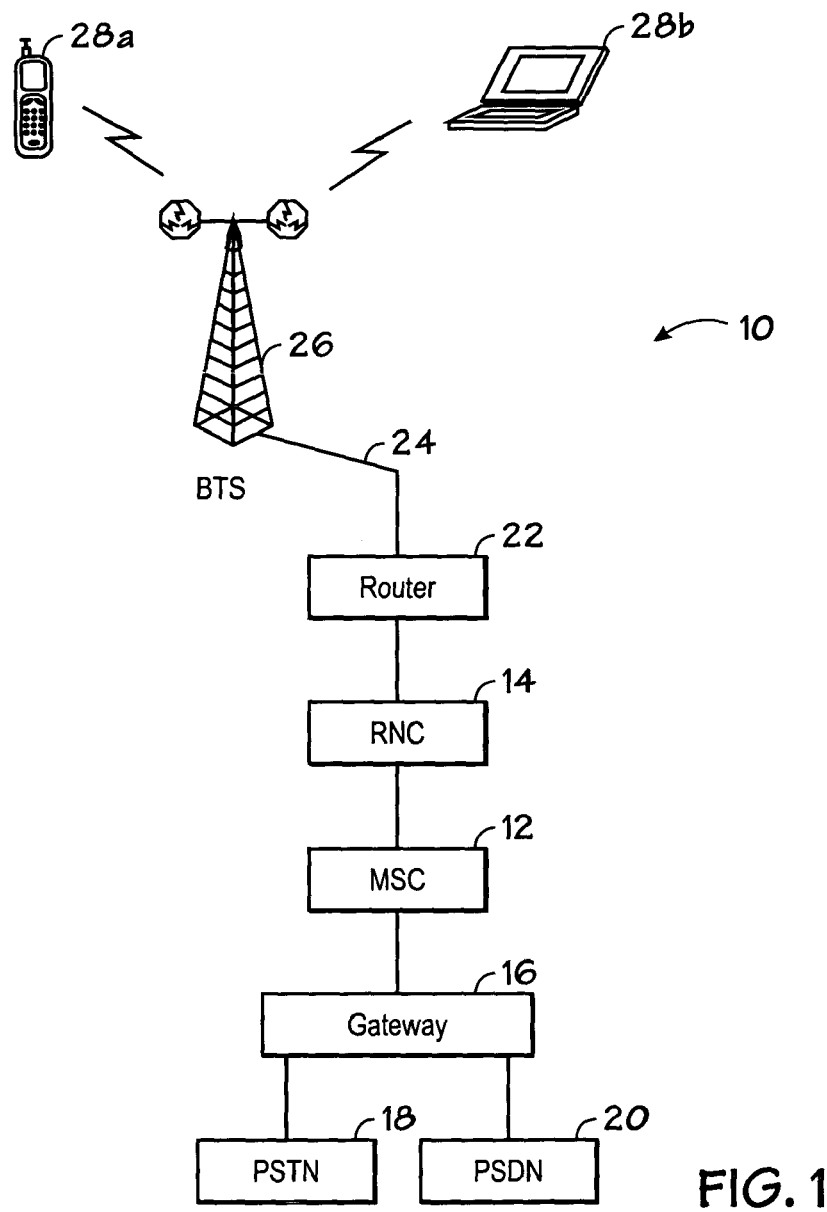
FIG. 1 is a block diagram of an exemplary wireless telephone system in accordance with one embodiment.

Turning now to the drawings and looking initially at FIG. 1, a block diagram of an exemplary wireless telephone system in accordance with one embodiment is illustrated and generally designated by a reference numeral 10. Those of ordinary skill in the art will appreciate that the wireless telephone system 10, described below, illustrates merely one embodiment of a radio access network ("RAN") configured to compress VoIP packet headers. As such, it will be appreciated that the techniques described herein may be employed in a variety of suitable wireless telephone systems or RANs including, but not limited to, Evolution Voice-Data Only ("EV-DO"), Code Division Multiple Access ("CDMA") 2000, Evolution Voice-Data Voice ("EV-DV"), and wideband CDMA. Moreover, it will also be appreciated that although the embodiment described below involves transmission of VoIP packets between two particular components of the telephone system 10, the techniques described herein could also be employed for transmitting VoIP packets between other components of the telephone system 10.

In any given wireless telephone market, such as a typical metropolitan area, the wireless telephone system 10 may include at least one mobile switching center ("MSC") 12. The MSC 12 is a switch that serves the wireless telephone system 10. The primary purpose of the MSC 12 may be to provide a data path between a mobile device and another telephone or data source. A typical MSC 12 includes a number of devices, such as computerized call routers, control switching functions, call processing, channel assignments, data interfaces, tracking, paging, call handoff, and user billing. The MSC 12 may be coupled to a gateway 16 which in turn may be coupled to a public switch telephone network ("PSTN") 18, which is often referred to as a land line telephone network. The gateway 16 may also be couple to a packet switch data network ("PSDN"), such as the Internet, so as to provide Internet service to wireless telephone users. Moreover, VoIP packets may also be transmitted to VoIP telephone users via the PSDN 20.

One or more radio network controllers ("RNC") 14 may also be coupled to the MSC 12. The RNC 14 may control the use and reliability of radio resources within the wireless telephone system 10. Specifically, the RNC 14 may control the allocation and release of specific radio resources to establish a connection to mobile devices (see below) and the MSC 12. In one embodiment, the RNC 14 may contain one or more application processors and/or traffic processors. In this embodiment, as VoIP packets are received for transmission to a mobile device at the RNC 14, the RNC 14 may be configured to append an outer header to each of the VoIP packets.

The RNC 14 may be communicatively coupled either by wire or wirelessly to a router 22. The router may be configured to receive IP packets, such as a VoIP packet, and to transmit those IP packets to the destination address stored in the IP packet. In one embodiment, the router 22 may be configured to compress the outer header of one or more VoIP packets.

The router 22 may be communicatively coupled via a connection 24 to a base transceiver station ("BTS") 26. In one embodiment, the connection 24 includes one or more T1 lines. In alternate embodiments, however, the connection 24 may include any suitable wired or wireless connection. For example, the connection 24 may include an Ethernet connection, a gigabit connection, or any one of a number of suitable wireless connections.

The BTS 26 is a transmission and reception station that acts as access points for network traffic from a variety of mobile devices represented in FIG. 1 by the portable wireless telephone 24a and the laptop computer 24b. The illustrated mobile devices, however, are merely exemplary, and in alternate embodiments, other suitable wireless devices may also communicate with the BTS 26. Moreover, although a single BTS 26 is illustrated in FIG. 1, those of ordinary skill in the art will appreciate that any suitable number of BTSs 26 may be communicatively coupled to the RNC 14. In one embodiment, the BTS 26 may be configured to compress the outer header of VoIP packets transmitted to the router 22.

Figure 2:
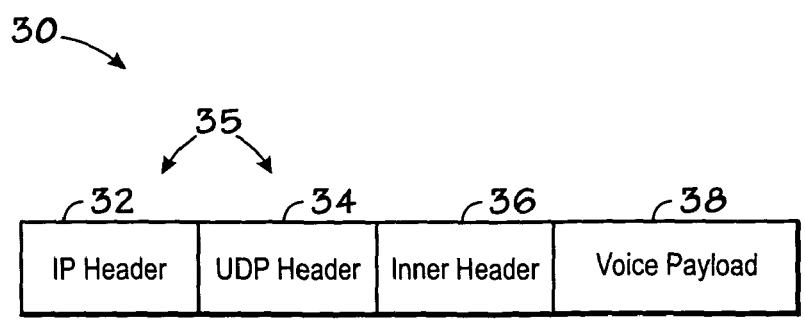
FIG. 2 is a block diagram of an exemplary voice over IP packet in accordance with one embodiment.

As discussed above, the router 22 and the BTS 24 may be configured to compress the outer header of VoIP packets. Before addressing this compression further, however, it may be helpful to outline one embodiment of an exemplary VoIP packet. Accordingly, FIG. 2 is a block diagram of an exemplary VoIP packet 30 in accordance with one embodiment. As described above, in one embodiment, the VoIP packet 30 may be transmitted between the router 22 and the BTS 26 or vice-versa.

As illustrated in FIG. 2, the VoIP packet 30 may include an IP header 32 and a user datagram protocol ("UDP") header 34, which collective comprise an outer header 35. The VoIP packet 30 may also include an inner header 36 and a voice payload 38. Looking first to the outer header 35, the outer header 35 may contain RAN routing and quality of service (QoS) information related to the VoIP packet 30. In particular, the IP header 32 may include a variety of suitable header fields including, but not limited to, a version field, a header length field, a type of service ("TOS") field, a total length field, an identification field, a time to live ("TTL") field, a source address field, and a destination address field.

The UDP header 34 may also include a variety of suitable header fields. For example, the UDP header 34 may include but is not limited to, a source port field, a destination port field, a length field, and a check sum field. It will be appreciated, however, that in non-UDP based networks, the UDP header 34 may be replaced with another header. For example, in a transmission control protocol ("TCP") based network, the UDP header 34 may be replaced with a TCP header.

The inner header 35 may contain network routing and quality of service (QoS) information related to the transmission of the packet across the Internet. As such, in one embodiment, the inner header 35 may include another IP header, another UDP header, and/or a real-time transport protocol ("RTP") header. Although the compression technique described below involves compressing the IP header 32 and/or the UDP header 34, it will be appreciated that in alternate embodiments, one or more of the above-described sub-headers within the inner header 36 may also be compressed.

Figure 3:
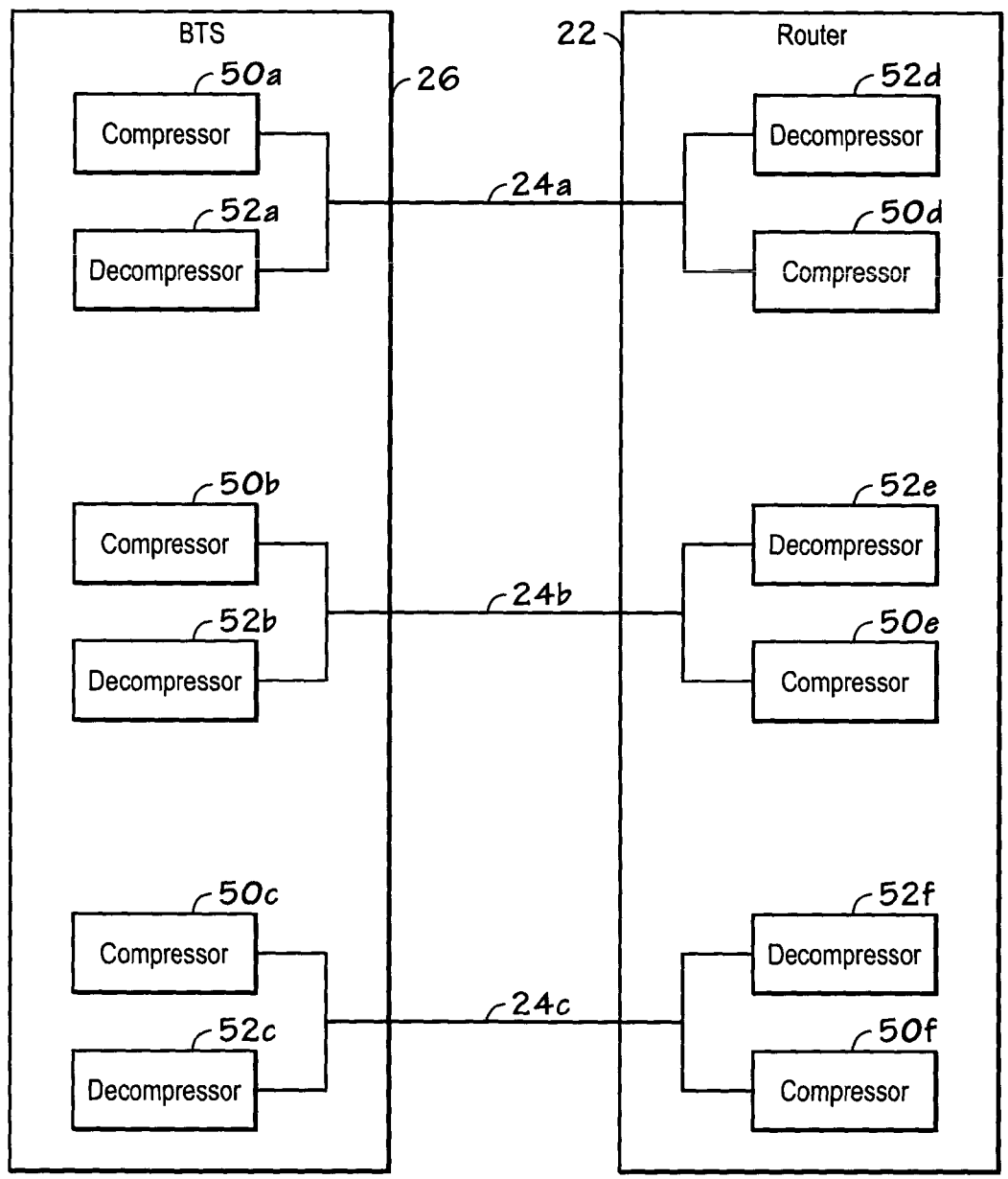
FIG. 3 is a block diagram of an exemplary base transceiver system and an exemplary router that are configured to compress voice over IP packet headers in accordance with one embodiment.

As described above, in one embodiment, the router 22 may be configured to compress the headers of the VoIP packet 32 and to transmit the compressed headers to the BTS 26 and vice-versa. Accordingly, FIG. 3 is a block diagram of an exemplary BTS 26 and an exemplary router 22 configured to compress voice over IP packet headers in accordance with one embodiment. As illustrated in FIG. 3, the BTS 26 and the router 22 may each include one or more sets of compressors 50 and decompressors 52 coupled via the connection 24 to another set of compressors 50 and decompressors 52. For example, the compressor 50a and the decompressor 52a within the BTS 26 may be coupled via the connection 24a to the compressor 50d and the decompressor 52d within the router 22. Similarly, the compressors 50b, 50c, 50e, and 50f and the decompressors 52b, 52c, 52e, and 52f may be coupled together, as illustrated in FIG. 3, by the connections 24b and 24c.

As described in further detail below, with regard to FIG. 4, the compressors 50 and the decompressors 52 may be configured to compress and decompress VoIP packet headers. In various embodiments, the compressors 50 and the decompressors 52 may also be implemented in hardware, software, firmware, or a combination of hardware, software, and firmware. For example, the compressors 50 and the decompressors 52 are implemented as software constructs executed on by the router 22 and/or the BTS 26.

In the embodiment illustrated in FIG. 3, each of the connections 24a, 24b, and 24c have their own compressor and decompressor on either side of the connection. In alternate embodiments, however, a pair of compressors 50 and decompressors 52 may be coupled on either side of multiple connections 24. Moreover, it will be appreciated the three connections 24a, 24b, 24c illustrated in FIG. 3 are merely exemplary. As such, in alternate embodiments, other suitable numbers of connections 24 may be arrayed between the router 22 and the BTS 26.

As described above, the compressor 50 and the decompressor 52 may be configured to compress VoIP packet headers. As such, FIG. 4 is a flow chart illustrating an exemplary technique 60 for compressing voice over IP packet headers in accordance with one embodiment. In one embodiment, the technique 60 may be executed by one of the compressors 50a-f in conjunction with a suitable one or the decompressors 52a-f to increase the backhaul efficiency of the system 10.

Figure 4:
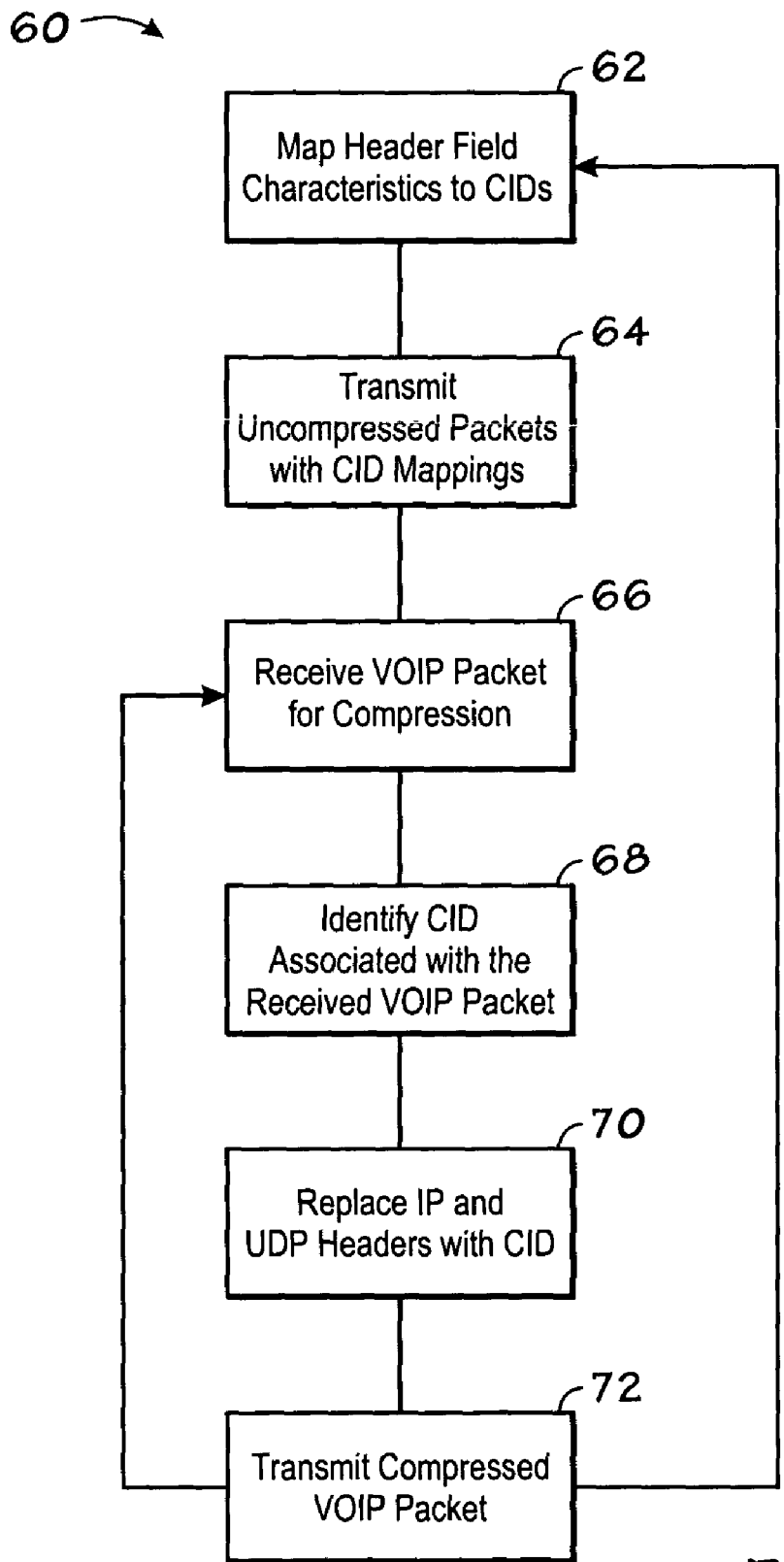
FIG. 4 is a flow chart illustrating an exemplary technique for compressing voice over IP packet headers in accordance with one embodiment.

As indicated by block 62 in FIG. 4, the technique 60 may begin with one of the compressors (50a, for example) mapping one or more header field values to one or more content identifiers ("CIDs"). The CIDs may include one or more numbers, letters, or other identifiers that may be associated with a particular combination of the VoIP packet header field values. In one embodiment, the CID is a 4-byte numerical identifier, such as "0001," "0101," and so forth.

Further, in one embodiment the CIDs may refer to locations on a look up table ("LUT") stored within the compressor 50a. For example, if the CID in this embodiment is a 4 byte number, the first two bytes of the CID may refer to a location on the x-axis of the LUT and the second 2-bytes may indicate a location along the y-axis of the LUT. In this embodiment, each individual location in the LUT may be associated with one group of VoIP header values. It will be appreciated, however, that the above-described CID configurations are merely exemplary. As such, in alternate embodiments, other suitable CID formats may be employed. For example, the CIDs may be mapped to any appropriate data structure, such as another type of table, linked-list, tree, and so forth.

As described above, the compressor 50 may map one or more header field values to the plurality of CIDs. For example, in one embodiment, the compressor 50a may map the values in the destination IP address field and a TOS field from the IP header 32 and the value from the destination UDP port field from the UDP header 34 to the CIDs. For example, a first CID may be associated with a first destination IP address, a first TOS field, a first UDP destination port; a second CID may be associated with a second destination IP address, the first TOS field, the first UDP destination port; a third CID may be associated with a third destination IP address, the second TOS field, and the first UDP destination port; and so forth. In addition, the compressor 50a may also be configured to map CIDs to indicate the compression state of the VoIP header (i.e., either compressed or non-compressed).

The destination IP address, TOS and destination UDP port may be selected from amongst the plurality of header fields within the VoIP packet 30 because these particular header fields may be sufficient to stand in the place of the IP header 32 and the UDP header 34 in VoIP transmissions. It will be appreciated, however, that the header fields mapped to the CIDs may be different in alternate embodiments. Moreover, in one embodiment, where the ToS field contains QoS related information, such as diff serve or the like, the technique 60 is able to support a multi-QoS and/or multi-flow VoIP functionality regardless the complexity of the topology of the system 10 or the number of QoS categories.

Moreover, in one embodiment, the full destination IP address may be replaced in the CID mappings with an IP ID offset referred to as the "Delta IP ID." This replacement may be advantageous when longer IP addresses (IPv6, for example) are used because delta IP addresses may considerably reduce the storage space needed to store the CID mappings. However, if the delta IP address is used when there is a packet drop or a transmission error, the complete IP address for subsequent packets may not be recoverable. As such, the complete destination IP address, also referred to as the absolute IP ID, may be preferred instead Delta IP ID if the packet error rate across the connection 24 is a relatively high (e.g., the connection 24 is a wireless connection).

As described above, the compressor 50a may be configured to map header field values to CIDs. In one embodiment, the compressor 50a may be configured to determine the number of CIDs using the following formula:

# of CID # of termination nodes*# of source nodes*# of connections*# of TOSs*# of compression states where the # of termination nodes are the number of possible destinations (e.g., call receivers) for the VoIP packet 30; the # of source nodes are the number of potential originators for the VoIP packet 30 (e.g., call originators); and the # of connections are the number of connections 24 between the router 22 and the BTS 26. It will be appreciated, however, that in alternate embodiments, other suitable techniques may also be employed to determine the number of CIDs to be mapped.

Returning now to FIG. 4, the compressor 50a may then transmit uncompressed IP packets containing the CID mappings to the decompressor 52d in the router 52, as indicated by block 64. When the decompressor 52d receives the CID mappings, it may create a duplicate set of CID mappings that the decompressor 52d can employ to decompress VoIP packet headers, as described in more detail below. In one embodiment, CID mappings are initialized/updated through a control message between the compressor 50a and the decompressor 52d. Such a control message may help to ensure error free compression, Moreover, a hand shake or acknowledge may be used with the control message so that the compressor 50a can verify receipt of the mappings by the decompressor 52d.

After transmitting the CID mappings to the compressor 52d, the compressor 50a may receive a VoIP packet 30 for compression, as indicated in block 66. When the compressor 50a receives the VoIP packet 30, it may read one or more of the headers of the VoIP packets 30 and determine which CID amongst the previously mapped CIDs would be associated with the VoIP packet 30, as indicated by block 68. For example, the compressor 50a may read the destination IP address, TOS, and destination UDP port from the VoIP packet 30 and identify the CID that corresponds to those header values.

After the CID associated with the VoIP packet 30 to be compressed has been identified, the compressor 50a may replace the IP header 32 and the UDP header 34 with the CID, as indicated by block 70. Replacing the relatively large IP header 32 and UDP reader 34 with the much smaller CID (e.g. 28 bytes versus 4 bytes) may effectively compress the overall size of the VoIP packet 30 by a considerable percentage. For example, in one embodiment, replacing the IP header 32 and the UDP header 34 may reduce the size of the VoIP packet header by 24 or more bytes, which is a compression ratio of approximately 84 percent.

In addition, as described above, in some embodiments, the compressor 50 may also add an absolute IP ID after the CID. It will be appreciated that the absolute IP ID may be included in the compressed VoIP packet because the delta IP ID may not be constant during multi-flow applications. As such, the absolute IP ID may be included alongside the CID in the compressed VoIP packet.

Once the IP header 32 and the UDP header 34 have been replaced by the CID (and possibly the absolute IP ID), the compressor 50a may transmit the compressed VoIP packet across the connection 24a to the decompressor 52d, as indicated by block 72. When the decompressor 52d receives the compressed VoIP packet, it will recover the destination IP address, the TOS, and the destination UDP port values using the transmitted CID and the stored CID mappings. The decompressor 52d will then restore those values back into the VoIP packet 30. At this point, the decompressor 52d may forward the VoIP packet to another component of the router 22 for forwarding routing to the appropriate destination.

As illustrated in FIG. 4, the compressor 50a may cycle back to block 66 and repeat block 66 through 72 as subsequent VoIP packets are received by the compressor 50a. In addition, the compressor 50a may also be configured to cycle back to block 62. In one embodiment, the compressor 50a may cycle back to block 62 periodically to refresh both its CID mappings and the CID mappings of the decompressor 52d. In another embodiment, the compressor 50a may be configured to cycle back to block 62 whenever there is a change in the number and or identification of VoIP sources or destinations. These examples, however, are merely illustrative, and, in alternate embodiments, the compressor 50a may be configured to remap the CID mappings for a number of suitable reasons.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

We claim:

1. A method comprising:
    receiving a voice-over-IP packet including at least one packet header that contains a set of one or more packet header field values;
    selecting a content identifier that corresponds to a location in a database of a mapped value corresponding to the one or more packet header field values of the received packet;
    replacing at least one of the packet-header field values in the received packet with the selected content identifier, thereby to create a compressed voice-over-IP packet; and
    transmitting the compressed voice-over-IP packet across a network connection.

2. The method, as set forth in claim 1, wherein the replacing at least one of the packet-header field values comprises replacing at least one packet-header field value from an outer header of the voice-over-IP packet.

3. The method, as set forth in claim 1, comprising:
    associating the content identifier with the one or more packet header field values.

4. The method, as set forth in claim 1, wherein selecting the content identifier comprises selecting a content identifier that corresponds to a destination IP address value from the received packet.

5. The method, as set forth in claim 1, wherein selecting the content identifier comprises selecting a content identifier that corresponds to a type of service value from the received packet.

6. The method, as set forth in claim 1, wherein selecting the content identifier comprises selecting a content identifier that corresponds to a user datagram protocol destination port value from the received packet.

7. The method, as set forth in claim 1, wherein the selecting the content identifier comprises selecting a content identifier from one or more locations on a look-up table with one or more packet header field values.

8. The method, as set forth in claim 1, comprising:
    receiving the compressed voice-over-IP packet from the voice over IP network connection;
    identifying one or more packet header field values that correspond to the content identifier in the received packet; and
    replacing the content identifier with the one or more corresponding packet header field values.

9. The method, as set forth in claim 1, wherein transmitting the compressed voice-over-IP packet across a network connection comprises transmitting the compressed voice-over IP packet across a T1 line.

10. A device configured to transmit voice-over-IP packets, the device comprising:
    a first compressor configured to:
    receive a voice-over-IP packet including at least one packet header that contains a set of one or more packet header field values;
    select a content identifier that corresponds to a location in a database of a mapped value corresponding to the one or more packet header field values of the received packet;
    replace at least one of the packet-header field values in the received packet with the selected content identifier, thereby to create a compressed voice-over-IP packet;

and transmitting the compressed voice-over-IP packet across a network connection.

11. The device, as set forth in claim 10, wherein the first compressor is configured to select a content identifier that corresponds to a destination IP address value from the voice-over-IP packet.

12. The device, as set forth in claim 10, wherein the first compressor is configured to select a content identifier that corresponds to a type of service value from the voice-over-IP packet.

13. The device, as set forth in claim 12, wherein the first compressor is configured to select a diff serve value from the voice-over-IP packet.

14. The device, as set forth in claim 10, wherein the device comprises a base transceiver station.

15. The device, as set forth in claim 10, the device comprising a second compressor, wherein the second compressor is configured substantial similar to the first compressor.

16. The device, as set forth in claim 15, wherein the device is coupled to a first T1 line and a second T1 line and wherein the first compressor is configured to communicate over the first T1 line and the second compressor is configured to communicate over the second T1 line.

17. The device, as set forth in claim 10, wherein the device is configured to associate the content identifier with one or more packet header field values.

18. A tangible machine readable medium comprising:
   code adapted to receive a voice-over-IP packet including at least one packet header that contains a set of one or more packet header field values;
   code adapted to select a content identifier that corresponds to a location in a database of a mapped value corresponding to the one or more packet header field values of the received packet;
   code adapted to replace at least one of the packet-header field values in the received packet with the selected content identifier, thereby to create a compressed voice-over-IP packet; and
   code adapted to transmit the compressed voice-over-IP packet across a network connection.

19. The tangible medium, as set forth in claim 18, comprising code adapted to associate the content identifier with a destination IP address value from an outer header of the voice-over-IP packet.

20. The tangible medium, as set forth in claim 18, comprising code adapted to associate the content identifier with one or more packet header field values.

* * * * *